United States Patent
Brooks

[11] 3,873,187
[45] Mar. 25, 1975

[54] LIGHT MODULATOR ARRAY AND METHOD OF MAKING IT

[75] Inventor: Robert E. Brooks, Manhattan Beach, Calif.

[73] Assignee: TRW Inc., Redondo Beach, Calif.

[22] Filed: Oct. 29, 1973

[21] Appl. No.: 410,730

[52] U.S. Cl. .......................................... 350/160 R
[51] Int. Cl. ............................................. G02f 1/28
[58] Field of Search .................... 350/160 R, 160 LC

[56] References Cited
UNITED STATES PATENTS

| | | | |
|---|---|---|---|
| 3,449,038 | 6/1969 | Scarrott | 350/160 R |
| 3,725,910 | 4/1973 | McNaney | 350/160 R X |

OTHER PUBLICATIONS
Handbook of Thin Film Technology, by Maissel et al., pgs. 7-48, 49, published by McGraw-Hill Book Co., 1970.

Primary Examiner—Ronald L. Wibert
Assistant Examiner—Paul K. Godwin
Attorney, Agent, or Firm—Daniel T. Anderson, Esq.; Edwin A. Oser, Esq.; Jerry A. Dinardo

[57] ABSTRACT

An array of light modulators particularly suitable for wideband holographic data recording. The light modulator may be arranged to be a light switch and preferably consists of a ferroelectric ceramic having electro-optical properties capable of changing under the influence of an electric field. A suitable electro-optical material is lead, lanthanum, zirconium titanate (PLZT). In order to provide a uniform electric field the electrodes are applied at right angles to the surface of the material. Accordingly, a strip of the material is provided with a plurality of parallel cuts to manufacture individual elements or islands each forming a modulator or light valve. The cuts are now filled with a conductive material such as a wire and a conductive paste or alternatively they are coated with a conductive material such as metal.

4 Claims, 7 Drawing Figures

PATENTED MAR 25 1975  3,873,187

LIGHT MODULATOR ARRAY AND METHOD OF MAKING IT

BACKGROUND OF THE INVENTION

This invention relates generally to light modulators and particularly to an array of such a modulator which may be operated as light switches.

Holographic data recording systems are well known in the art. They have certain advantages such, for example, that the information is spread over the entire holographic plate. Accordingly, the holographic plate is substantially immune to localized scratches or imperfections. Furthermore, such systems permit very dense recording on a relatively small area.

Such optical data recording systems, however, require an array of light modulators. Such a modulator may, for example, consist of a member of the class of ferroelectric ceramics. Such materials must be transparent to optical radiation and must have electro-optical properties capable of changing under the influence of an applied electric field. Among these ferroelectric ceramics is lead, lanthanum, zirconium titanate which is usually referred to as PLZT from the initials of the corresponding elements; it is also known as lanthanium-doped lead-zirconium titanate. It forms a mixture analogous to an intermetallic compound which may be defined as follows: $Pb_{(1-3x/2)}La_x(Zr_yTi_z)O_3$. The values for $x, y, z$ may be varied for various applications. Usually the following values are used $x = 0.09, y = 0.65$ and $z = 0.35$. This will yield a composition of $Pb_{.865}La_{.09}(Zr_{.65}Ti_{.35})O_3$.

This material has been described in a recent paper by Carl et al., which appears in Proceedings of the IEEE, Volume 61, No. 7, July 73 on pages 967 – 974 and is entitled "Dielectric and Optical Properties of a Quasi-Ferroelectric PLZT Ceramic." In this connection notice is particularly made of the references quoted in this paper and particularly reference (1). This material has the property that its birefringence varies under the influence of an externally applied field. This electrically induced effect can be used to rotate the plane of polarization of the transmitted light. Hence by using an additional polarizer or analyzer interposed into the path of the light having passed the ceramic material the intensity of the transmitted light may be modulated or the light may be caused to either pass or not to pass. Another advantage of PLZT ceramics is the relatively low voltage required to provide a differential phase retardation of one-half wave of the optical radiation. For example, for visible light passing through a wafer of PLZT with a thickness of 10 mils (or 0.010 inch) an electric field of approximately 800 volts per millimeter is adequate to obtain a one-half wave retardation and hence maximum switching. Assuming the electrodes are 10 mils apart, a voltage of only approximately 200 volts is required to completely switch the material. Such low switching voltages may be supplied by a circuit housing inexpensive transistors.

In the past it has been proposed to provide electrodes on the exposed surface of a strip of PLZT material for the purpose of applying an electric field thereto. However it is desirable that the electric field be applied parallel to the outer or exposed surface of the electro-optical material. It has been found that surface electrodes are not effective in producing a uniform electric field in the material. Such an electric field may also cause crosstalk problems between adjacent electro-optical elements.

It is accordingly an object of the present invention to provide an array of light modulators consisting of a ferroelectric ceramic having electro-optical properties capable of changing under the influence of an electric field and having electrodes extending substantially normal to the surfaces through which the light passes.

Another object of the present invention is to provide a method of manufacturing an array of light modulators of the type discussed which will result in electrodes extending substantially at right angles to the plane surfaces of the material and where each element can be made extremely small to facilitate the data recording.

A further object of the present invention is to provide a method for coating a metal on a plurality of parallel cuts extending through a strip of electro-optical material of the type discussed.

SUMMARY OF THE INVENTION

A light modular array in accordance with the present invention comprises an electro-optical material capable of changing its optical properties under the influence of an electric field and which is transparent to optical radiation. The material has substantially a rectangular shape. As explained before, such a material may be a ferroelectric ceramic such, for example, as a member of a class of materials designated PLZT. A plurality of substantially parallel cuts extends through the electro-optical material to provide a plurality of individual electro-optical elements. Finally a conductive material is disposed in each of the cuts to provide electrodes. These electrodes in turn permit to apply an electric field substantially parallel to the surface of each element.

The conductive material in each cut may, for example, consist of a wire and a conductive paste which jointly provide an electrode. Alternatively, the conductive material may consist of a conductive coating extending at least along the walls of each cut. If there is any remaining space in the cuts it may be filled with a conductive material.

Preferably, the strip of electro-optical material may be supported by a substrate through which the cuts extend. Also the strip of electro-optical material may be supported by blocking elements extending along the long sides of the material to prevent motion of the strip and to align the strip.

There are further disclosed methods for manufacturing such an array of light modulators.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
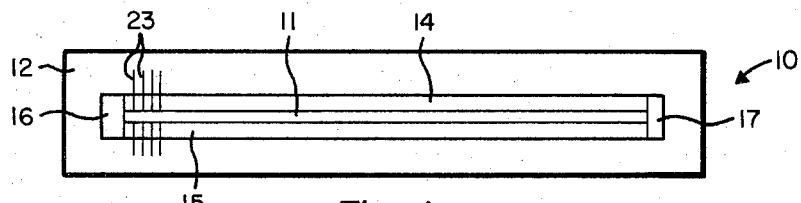
FIG. 1 is a top plan view of an array of light modulators in accordance with the present invention.
Figure 2:
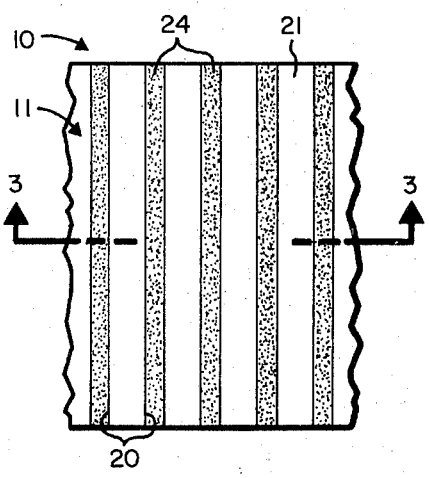
FIG. 2 is a fragmentary top plan view of the structure of FIG. 1 on greatly enlarged scale.
Figure 3:
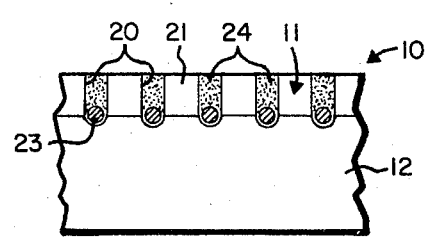
FIG. 3 is a cross-sectional view taken on line 3 — 3 of FIG. 2 to illustrate a wire disposed in each cut of the electro-optical strip and a conductive paste filling the space of each cut.

Referring now to the drawing wherein like elements are designated by the same reference characters, and particularly to FIGS. 1 to 3, there is illustrated an embodiment of the light modulator array of the invention. The array 10 of FIGS. 1 – 3 is provided with a strip 11 of electro-optical material which is transparent to optical radiation and capable of changing its optical properties under the influence of an electric field. As previously mentioned a material of the class PLZT is suitable for the strip 11. The electro-optical material 11 may be disposed on a substrate 12 which should also be transparent to the same optical radiation. A suitable material for the substrate 12 is either glass or quartz such as fused quartz, or sapphire in case good thermal conduction is required.

Preferably the electro-optical strip 11 is of rectangular shape as shown and may be surrounded on its long sides by two strips 14 and 15 of a blocking material which serves the purpose of properly aligning the electro-optical strip 11 and to protect the edges of the PLZT. If desired, two more pieces of blocking material 16 and 17 may be disposed at the ends of the electro-optical strip 11.

By way of example, the strip 11 may have a width of 0.1 inch and a thickness of 0.010 inches or 10 mils. The strips of blocking material 14 – 17 preferably have the same thickness, that is 10 mils.

In accordance with the present invention a plurality of cuts 20 (see FIG. 3) are made which extend through the strip 11 and preferably into the substrate 12. Accordingly, as shown in FIGS. 2 and 3, the strip 11 is subdivided into a plurality of individual elements or islands such as 21. Each island is physically and electrically isolated from the adjacent ones.

Inserted into each of the cuts 20 is a thin wire 23 as clearly shown in FIG. 3. As shown in FIG. 1 thin wires 23 extend through the blocking strips 14 and 15 and may be connected to an electronic circuit for applying a desired electric potential to each of the islands 21. Finally, each cut 20 is filled with a conductive paste or material 24 which may, for example, consist of a conductive epoxy resin.

It will now be appreciated that each wire 23 and its associated conductive material 24 forms an electrode. These electrodes are disposed at the two vertical walls of each island 21. They permit to apply an electric field across each island. This electric field extends parallel to the exposed surface of each island. Electric fringing fields are negligible due to the very high dielectric constant of PLZT which is about 6,000. Thus, virtually all the electric field lines are contained in the material and do not stray into the substrate or air. As a result, the capacitance becomes a minimum which means that a minimum electric charge is required for switching each element. Furthermore, the confinement of the electric field to the useful optical aperture, that is to each island of PLZT, minimizes the heat which is otherwise generated. It also provides virtually complete electrical isolation of each island 21 from adjacent islands to minimize crosstalk. The wires 23 forming the leads are relatively large and therefore ohmic contact problems are minimized.

While FIGS. 1 – 3 illustrate a linear array of light modulators it will be apparent that two dimensional arrays may be constructed in a similar manner. All that would be necessary is to provide sufficient space between adjacent linear arrays for the wires such as 23 to pass to the end of the array. Thus, several linear arrays such as two to four may be arranged in rows with suitable space therebetween.

The manufacture of a light modulator array in accordance with the present invention and as illustrated in FIGS. 1 – 3 will now be described. The individual cuts 20 are preferably cut by an abrasive saw. The cuts may, for example, be made with a rotating diamond saw. Preferably, however, a wire saw made of steel wire impregnated with diamond dust and an abrasive slurry may be used to provide narrower cuts. This will also minimize clipping the edges of the electro-optical material. Accordingly, the size of each cut depends on the thickness of the saw; assuming however the diamond wheel is such that each cut has a width of 5 mils; in this case the width of each island may be 10 mils. Accordingly, the saw will be advanced 15 mils between cuts. Thus the assembly shown in FIG. 1 may be mounted on the table of the saw and the table may be advanced 15 mils after each cut. Assuming it is desired to provide an array of 256 elements, the total length of the strip 11 is 3.84 inches.

It may not be possible to produce a single strip 11 of the desired electro-optical material of such a length. In that case several individual strips may be disposed end to end, care being taken that they precisely butt each other where saw cuts will occur. The blocking strips 14, 15 as well as 16, 17 may also consist of glass. They serve the additional purpose to protect the edges of the electro-optical strip 11 during cutting. Thus the strips 11 may be glued to the substrate 12 by any suitable transparent adhesive material such as by the application of an epoxy resin. The strips 11 are then aligned by means of the blocking strips 14, 15; 16, 17. The epoxy may then be allowed to heat cure.

The entire assembly may then be covered with a lacquer to protect it during the cutting operation.

After the cutting the assembly may have to be cleaned and the protective lacquer layer removed. Preferably, at this stage the individual islands 21 are polished and coated with an anti-reflective coating. If desired, the entire assembly may be covered like a sandwich with a second substrate which should also be transparent to the optical radiation and which is to act as an additional heat sink.

It will be understood that the use of the blocking strip 16, 17 is optional as is the use of the longitudinal blocking strips 14, 15. However, if the blocking strips 14, 15 are used the cuts should extend through these strips and into the substrate 12 as clearly shown in FIG. 3 to make sure that each island 21 is physically isolated from the adjacent island.

It is also feasible to manufacture the linear modulator array of the invention in a different manner. In this case it is not necessary to individually string wires through each cut and fill up the remaining space with a conductive space. Instead each cut is coated with a suitable conduction material. Such a manufacturing method has been illustrated in sequence in FIGS. 4 – 7.

Figure 4:
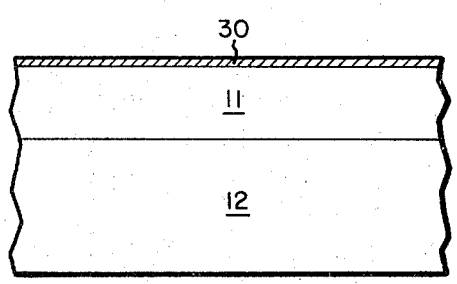
FIGS. 4 – 7 are sectional views similar to that of FIG. 3 and illustrating in sequence how the electro-optical material is secured to a substrate, cut and subsequently coated with a metal to provide electrodes in each cut.

FIG. 4 shows a cross-sectional view on enlarged scale of the substrate 12 with the electro-optical strip 11 secured thereto by a suitable adhesive. The strip 11 is now coated with a layer 30 of a protective material which may subsequently be removed by a chemical compound and which compound will not attack or remove the desired metal electrodes. Thus, by way of example, the coating 30 may consist of silver which may be dissolved by a ferrocyanide. Alternatively, the coating 30 may consist of a photoresist which is a light-activated polymer. It bonds tightly to the surfaces such as the surface of the islands 21. Nevertheless, it is easily removed by a number of solvents. Subsquently, the structure is cut again in the matter previously discussed to provide a plurality of cuts 20 (see FIG. 5) extending through the substrate 12. This will again form individual islands 21.

Figure 5:
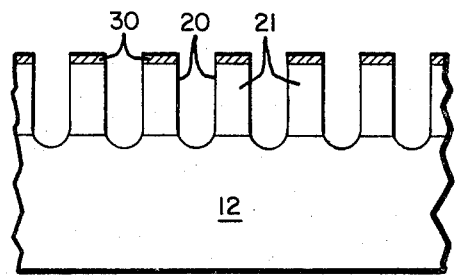
Figure 6:
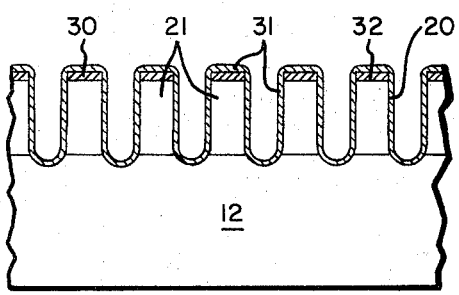
Figure 7:
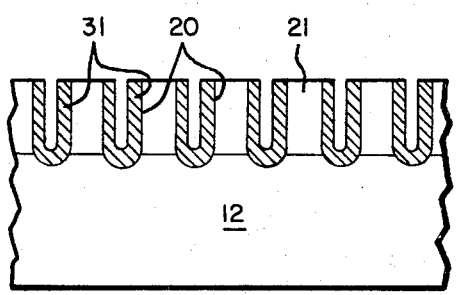

The structure of FIG. 5 is now coated with a layer 31 (FIG. 6) which extends over the protective layer 30 and into each cut 20. The layer 31 may, for example, consist of copper which is not removed by the ferrocyanide. It is now desired to remove the remaining protective layer 30 and copper layer 31 at the top surface 32 of each island 21. This is effected by dissolving or removing the silver layer 30 with ferrocyanide. The compound or solvent reaches the silver layer 30 through a thin or discontinuous edge portion of the copper layer 31 or else through microscopic pin holes in the thin copper layer 31 to dissolve the silver. The thus obtained structure is shown in FIG. 7. The copper layer 31 now only coats the walls of each cut 20 of the respective islands 21.

By additional copper plating the layer 31 may now be built up as shown at 35 in FIG. 7. Suitable leads may now be attached to each electrode 31, 35 in each of the cuts and the modulator array is ready for use. It will be understood that the manufacturing method illustrated in FIGS. 4 – 7 requires less hand operations and may be carried out automatically. On the other hand it is still necessary to attach a lead to each electrode 31, 35.

There has thus been disclosed a light modulator array which may serve as an array of light valves for holographic data recording and the like. The array is characterized by a multiplicity of individual electro-optical elements each being provided with a pair of electrodes substantially at right angles to the flat exposed surfaces of each island. This will permit to generate an electric field parallel to the flat faces of each element or island with a resulting increase in efficiency, a decrease of heat generation and a minimum of undesirable capacitance. Two methods have been described for manufacturing such an array which may, for example, consist of 256 individual elements.

What is claimed is:

1. The method of manufacturing an array of light modulators from a substantially rectangular strip of electro-optical material transparent to optical radiation, said method comprising the steps of:
   a. mounting the strip of electro-optical material on a substrate having a substantially plane surface and being transparent to the optical radiation;
   b. coating the electro-optical material with a first protective coating removable by a chemical compound;
   c. repeatedly cutting through the protective coating, the electro-optical strip and into the substrate to provide a plurality of substantially parallel cuts defining a plurality of individual electro-optical elements;
   d. coating the thus obtained structure with a metal forming a second coating which is not removed by the compound; and
   e. removing the first coating but not the metal from the original surface of the electro-optical strip, thereby to obtain a plurality of electro-optical elements, the cuts of which are coated with the second coating.

2. The method defined in claim 1 which includes the additional step of attaching a conductive lead to the conductive metal in each cut.

3. The method of preparing a plurality of electro-optical elements for a substantially rectangular strip of material to form a light modulator array which comprises the steps of:
   a. mounting the rectangular strip of electro-optical material on a substrate having a plane face and being transparent to the same optical radiation as is the strip;
   b. cutting through the strip and a portion of the substrate to provide a plurality of substantially parallel cuts to seperate the strip into a plurality of individual electro-optical elements; and
   c. coating at least the walls of each cut with a conductive material to provide electrodes substantially at right angles to the surface of the strip of electrooptical material.

4. The method defined in claim 3 including the additional step of surrounding the electro-optical material along both long sides thereof with a blocking material having substantially the same depth as the electro-optical material and prior to the cutting step, but after the mounting step, whereby the blocking material serves the purpose of aligning the electro-optical material with respect to the substrate.

* * * * *